(12) United States Patent
Couwenberg et al.

(10) Patent No.: US 6,285,803 B1
(45) Date of Patent: Sep. 4, 2001

(54) METHOD AND APPARATUS FOR RESOLUTION ENHANCEMENT BY SYNTHESIS OF SCAN SIGNALS

(75) Inventors: Wilhelmus J. Couwenberg, Weurt; Johannes W. M. Jacobs, Kessel, both of (NL)

(73) Assignee: OCÉ-Technologies B.V., Ma Venlo (NL)

( * ) Notice: Subject to any disclaimer, the term of this patent is extended or adjusted under 35 U.S.C. 154(b) by 0 days.

(21) Appl. No.: 09/148,485

(22) Filed: Sep. 4, 1998

(30) Foreign Application Priority Data

Sep. 4, 1997 (NL) .................................................. 1006937

(51) Int. Cl.$^7$ ...................................................... G06K 9/32
(52) U.S. Cl. ............................................................ 382/299
(58) Field of Search ...................................... 382/299, 300, 382/301, 268, 255, 280, 318, 317, 321, 319

(56) References Cited

U.S. PATENT DOCUMENTS

| | | | |
|---|---|---|---|
| 5,029,228 | * 7/1991 | Nonoyama et al. | 382/305 |
| 5,121,445 | * 6/1992 | Tsujiuchi et al. | 382/43 |
| 5,408,270 | * 4/1995 | Lim | 348/429 |
| 5,572,608 | * 11/1996 | Edgar | 382/321 |
| 5,633,745 | * 5/1997 | Chen et al. | 359/201 |
| 5,638,164 | * 6/1997 | Landau | 356/5.01 |

FOREIGN PATENT DOCUMENTS 9527627A   10/1995   (WO) .

OTHER PUBLICATIONS

Patent Abstracts of Japan, vol. 18, No. 570 (E–1623), Oct. 31, 1994 & JP 06 209463A (GC Technol KK) Jul. 26, 1994.

* cited by examiner

*Primary Examiner*—Andrew W. Johns
*Assistant Examiner*—Seyed Azarian

(57) ABSTRACT

Digital image data of high resolution are obtained by synthesizing the scanning signals of two scanners, which scan an original document with mutually different lower resolutions. The synthesis includes transforming the scan signals of the first scanner into a first spectrum and transforming the scan signals of the second scanner into a second spectrum, superposing in predetermined manner versions of the first and second spectrum shifted over the spectral axis, and deriving a third spectrum from the result thereof. Retransformation of the third spectrum produces digital image data with a high resolution.

20 Claims, 5 Drawing Sheets

METHOD AND APPARATUS FOR RESOLUTION ENHANCEMENT BY SYNTHESIS OF SCAN SIGNALS

BACKGROUND OF THE INVENTION

1. Technical Field of the Invention

The invention relates to a method and apparatus for generating digital image data. More particularly, this invention relates to digital image generation with, for example, a digital copying machine or a free-standing scanner apparatus.

In apparatus of this kind, a document having an image thereon is scanned with an electro-optical converter to generate digital image data which contain a grey value for each image element or pixel. This is usually done with a CCD array, on which a part of the document in the form of a line is projected by an optical imaging system. By moving either the document or the imaging system in a direction perpendicular to the scanning line of the document, the document is scanned completely, line-by-line, in accordance with a usually rectangular raster of pixels.

The spatial density or resolution of the pixels is, in practice, on the order of some hundreds of pixels per inch, usually specified as "dpi" (dots per inch).

2. Description of Related Art

Digital image data of the kind described above can be processed in the spatial domain, but it has also been proposed to process such data in the frequency domain. The latter domain is for instance particularly suited for filtering operations, in which disturbing elements, which often have frequencies outside the range of those of the image information, can be removed easily from the digitised image.

In this connection, also the combined use of image data generated from one image by two scanners each having a resolution different from the other, is proposed.

For instance, U.S. Pat. No. 5,121,445 describes a method aimed at removing moiré patterns. Patterns of this kind occur when a rastered image is scanned with a scanner, due to the fact that the raster frequency of the image interferes with the scanning frequency (resolution) of the scanner. The interference causes frequency domain sidebands on either side of the spectrum of the original non-rastered image. Also, the entire spectrum, including the sidebands, is periodically repeated as a result of the discrete scanning by the scanner. These sidebands contain information on both the rastering and the scanning. The known method comprises eliminating the side bands as far as possible by comparing the spectra of the image data from the two scanners, so that the original non-rastered image can be reconstructed. Thus, this method not only removes the moiré but also the raster. Effectively, therefore, information present in the scanned image is destroyed.

SUMMARY OF THE INVENTION

An object of the present invention is to retain as far as possible all the information in the scanned image. Another object is to increase the dpi of a scanned image.

For a good description of an image it is of course desirable that pixels should have a high spatial density. However, high-resolution systems are expensive, both because of the requirements relating to the CCD array and the requirements relating to the optical imaging system. Therefore, there is a demand for a scanner system which generates image data at high resolution and yet is constructed from simple and hence inexpensive components. The present invention meets this demand.

To this end, the method according to the invention includes the following steps:

1) generating first digital image data by scanning the image with a scanner having a first resolution f1;
2) generating second digital image data by scanning the image with a second scanner having a second resolution f2 higher than f1; and
3) combining the first and second digital image data to form third digital image data, which describes the image with a third resolution f3 which is higher than f1 and higher than f2.

According to one embodiment, step 3) includes the following sub-steps:

a) transforming the first digital image data into a first spectrum, and transforming the second digital image data into a second spectrum, which spectra have an amplitude on a spectral axis;
b) superposing in a predetermined manner versions of the first and second spectrum shifted over the spectral axis, to give a first combination;
c) deriving a third spectrum from the first combination; and
d) re-transforming the third spectrum, the result being interpreted as the third digital image data.

The invention is based on combining the image data of two scanners, each of which has a relatively low resolution different from the other, to give image data of a higher resolution. This combination is possible in the frequency domain. The digital image data are therefore first transformed thereto with a Fourier transform, whereafter they are processed further. Alternatively, it is possible to subject the image data to a cosine transform and carry out the combination in the cosine domain.

These resolutions are preferably selected such that $$f3=f1+f2-G(f1, f2)$$

where G(a,b) is the highest common divisor of a and b. On the basis of theoretical considerations, this value of f3 is the highest frequency at which the results of the method still form a reliable estimate of the original image, i.e., still correspond to the original image, if the latter were scanned at the resolution f3. There is, therefore, no point in making f3 higher, because it does not yield any more information. On the other hand, it is also undesirable to make f3 lower, because then the information present in the image data is not used to maximum effect.

As a marginal condition for the values of f1 and f2, their ratio must be a rational ratio because it is only in that case that the theory on which the processing of the digital image data from the scanner is valid. However, this does not form any limitation, because this is always the case as a result of the discrete form of the scanners.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
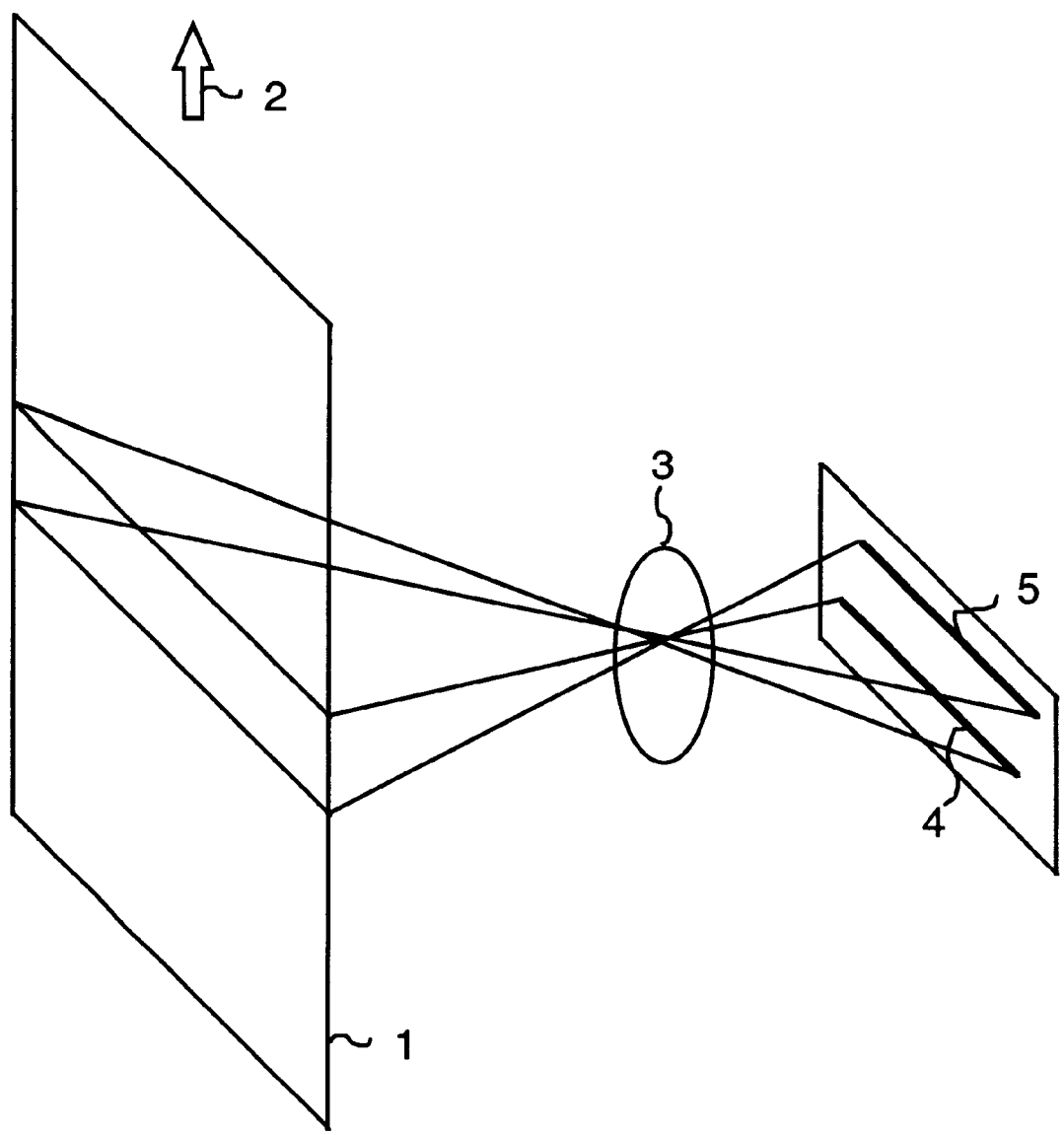
FIG. 1 is a diagram showing the principle of the scanner apparatus according to the invention.

FIG. 1 is a sketch showing the principle of a scanner according to the invention. An original document 1 is transported in a direction 2 at a uniform speed. A lens 3 images the document on two CCD arrays 4 and 5, each which scan a separate line area, perpendicular to the direction of transport 2, of the document. Signals are generated by each of the CCD arrays 4,5 in accordance with the grey values of image parts or pixels. These signals are converted to digital image data by means of A/D converters. Since the document is transported along the imaging system, the entire document is scanned line-by-line.

Generally, a combination of a CCD array and a lens is also termed a "camera". The scanner device of FIG. 1 thus comprises two cameras.

Array 4 scans the document with a resolution f1 and array 5 does so with a resolution f2, which is different from f1. This can be effected by using CCD arrays having different CCD densities. Alternatively, different resolutions can be achieved by making the imaging system (the lens) different for each of the arrays, so that one array scans the document with a different enlargement from the other.

Instead of the lens in FIG. 1, it is also possible to use a selfoc lens array (an array of imaging optical fibres).

It is also possible to scan the document twice with different magnification, using one camera having variable magnification, and to store the signals of the two scans in a memory. The signals with different resolution are then not generated simultaneously, but can be delivered in synchronism by reading out of the memory simultaneously or semi-simultaneously the signals corresponding to the same line position.

Figure 2:
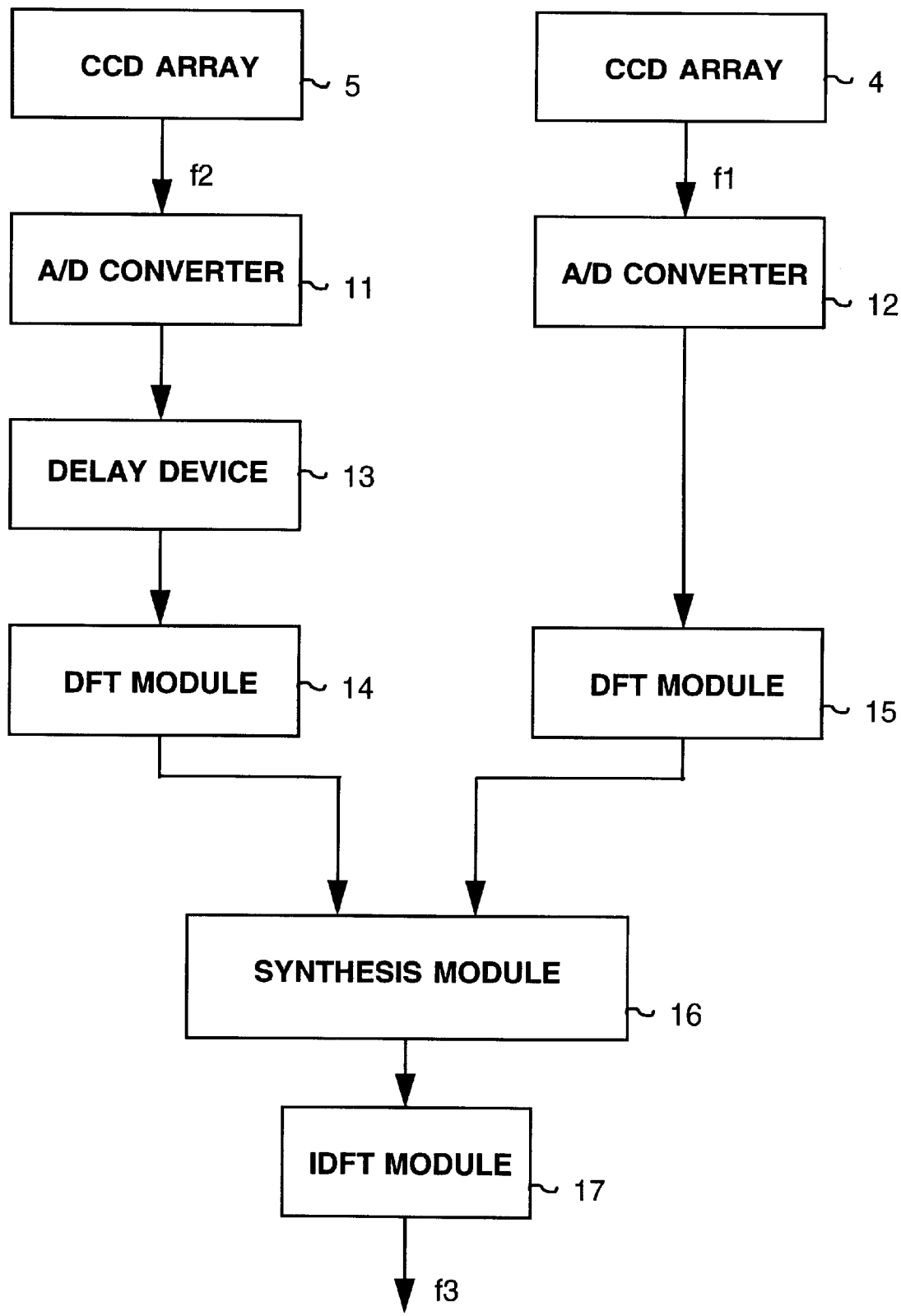
FIG. 2 is a block schematic of the apparatus according to the invention.

FIG. 2 is a block schematic of the apparatus according to the invention in the embodiment of FIG. 1. The CCD arrays 4 and 5 are each connected to an A/D converter 11, 12 respectively, to convert their respective analog signals into digital image data. The A/D converter 11 is connected to the delay device 13 for synchronising the image data, so that the image data delivered in the two channels relate to the same linear area on the scanned document. The delay device 13 is connected to a DFT module 14 and the A/D converter 12 is connected to a DFT module 15. A DFT module performs a discrete Fourier transformation on the image data.

The DFT modules 14,15 are each connected to a synthesis module 16. This is intended to combine the transformed image data from the two channels into transformed image data having a higher resolution f3 in the frequency domain. The operation of the synthesis module will be described hereinafter.

The synthesis module 16 is in turn connected to an inverse DFT module 17 for transforming the data from the synthesis module into digital image data having the higher resolution f3.

The apparatus described here can be constructed as an independent scanner device for scanning documents. Such a construction generates digital image data, which are then delivered via an electrical connection to, for example, a workstation or computer. The apparatus can also form part of a digital copying apparatus, in which the scanner signals are converted to control signals for a printing apparatus, whereby the latter prints a copy of the document on an image support, such as a sheet of paper. The structural elements required for the construction as shown in FIG. 1, although not described above, are generally known to one of ordinary skill in the art.

Before discussing the procedure for processing two image signals of spatial frequencies f1 and f2 respectively, to form an image signal of spatial frequency f3, reference will first be made to FIGS. 3A and B, which show the effect of scanning on the image signal.

The basis utilized in the following will be an original image, the spatial progress of the image information of which will be designated the "original signal h". The spectrum of "h" will be designated "H".

Figure 3A:
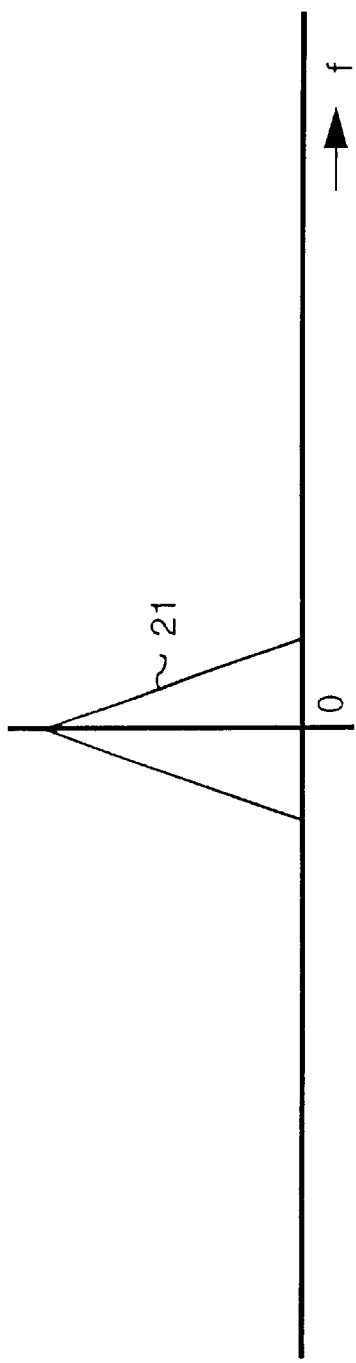
FIG. 3A is a simplified spectrum of an original image.
Figure 3B:
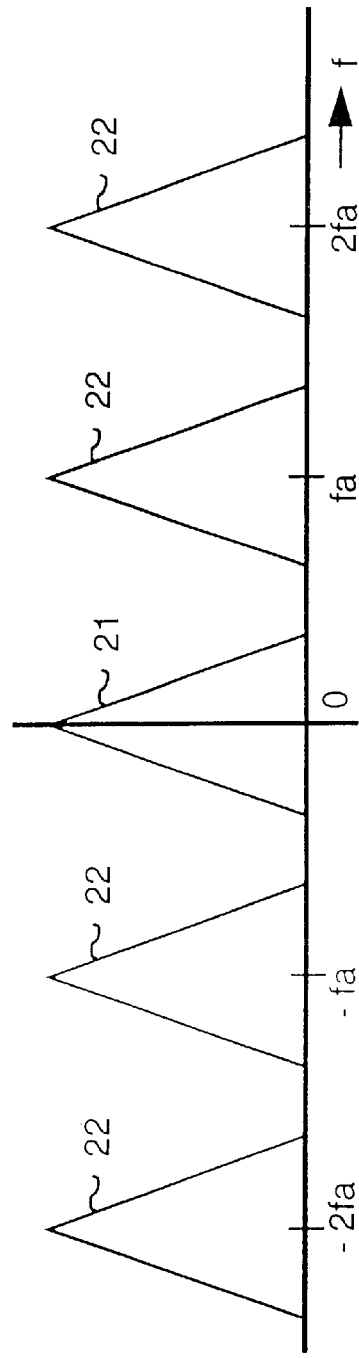
FIG. 3B is a spectrum of a scan signal of an image.

FIG. 3A shows a (simplified) spectrum (H) 21 of the original image (h). When this image is scanned with a spatial frequency fa, a scan signal is generated with a spectrum as shown in FIG. 3B. This spectrum contains the original spectrum 21 and periodic repetitions 22 of this spectrum at multiples of the scanning frequency fa. When the scanning frequency fa is sufficiently high compared with the extent of the original spectrum, the original image signal can be recovered faultlessly from the spectrum of the scanning signal. If the bandwidth of h is greater than fa/2, then the periodic repetitions of the original spectrum will overlap one another and distortion will occur so that the original image signal h can no longer be recovered faultlessly. This is known as the Nyquist theorem in signal theory.

The spectrum $H_a$ of an original signal h scanned at a frequency fa can now be described as:

$$H_a = \sum_{k=-\infty}^{\infty} T^{kfa} H$$

wherein

H is the spectrum of h and $T^s$ is a shift operator defined as: $(T^s f)(t) = f(t-s)$, where f is any function.

This formula is the mathematical representation of what is shown in FIG. 3B.

Figure 4:
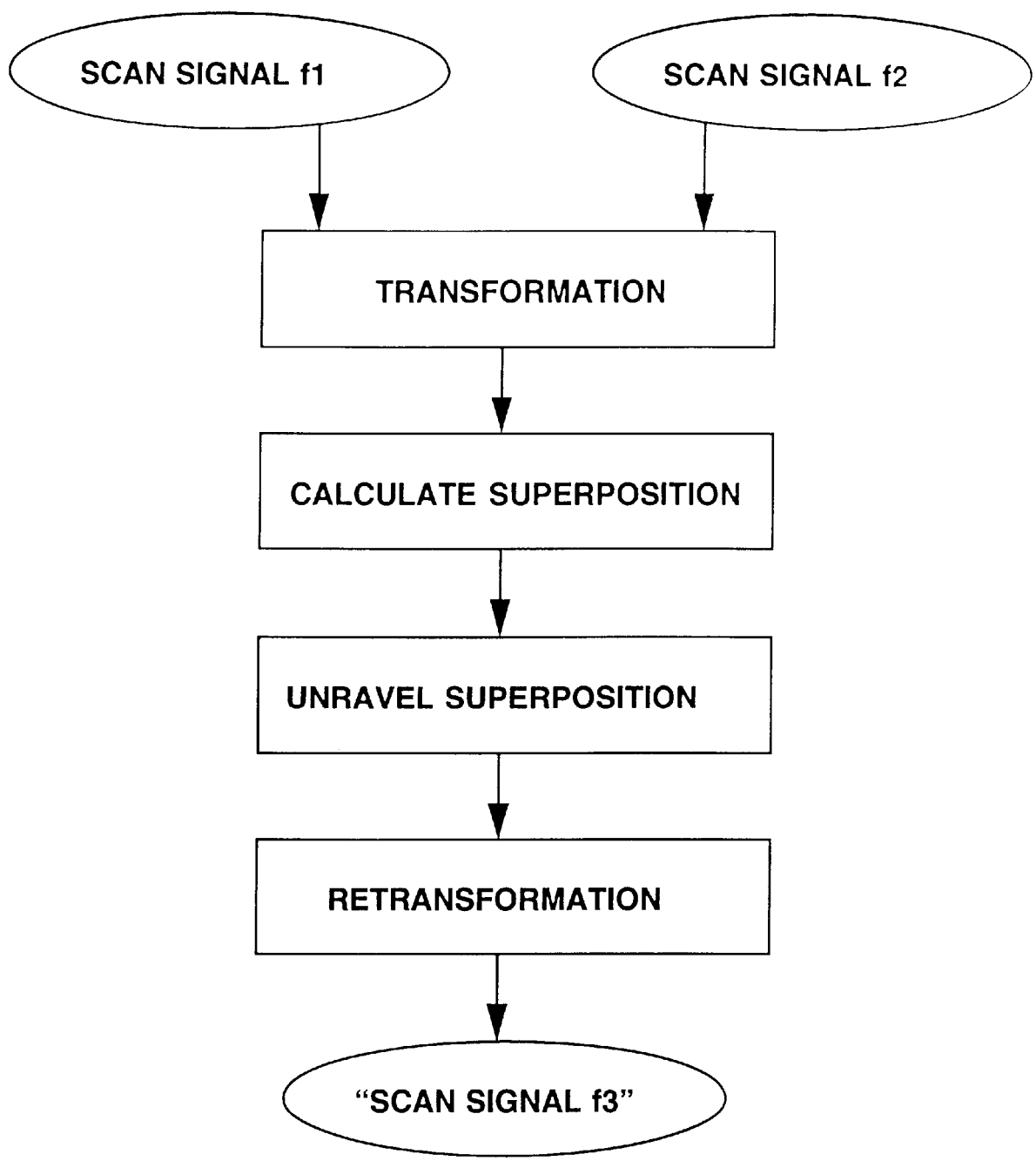
FIG. 4 is a diagrammatic representation of the process of reconstructing a high-resolution signal from the two lower-resolution scan signals in accordance with the invention.

The process of reconstruction of an approximation of the original signal h from the two scanning signals or, more generally, of the processing of two image signals of frequencies f1 and f2 respectively, to form an image signal of frequency f3, is shown in FIG. 4.

The reconstruction progresses in four steps. In the first step, the spectra of the scanning signals are calculated by utilizing a Fourier transform. In the second step, a superposition of the spectra of the scanning signals is calculated. In the third step, the result of the superposition is unravelled so that (by approximation) the spectrum H of the original signal remains. The (approximated) original signal is derived from this in the fourth step by inverse Fourier transformation, so that it would appear as if scanning was carried out at the increased frequency f3.

This procedure will now be explained by reference to a numerical example. The general case will be discussed hereinafter.

Two scanning frequencies f1=200 dpi and f2=300 dpi are used for this example.

The various steps of the process as described with reference to FIG. 4 will now be described in greater detail.

First Step

Figure 5A:
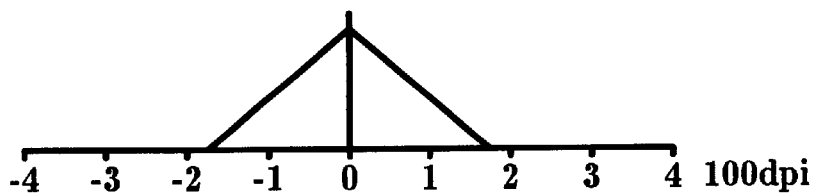
FIGS. 5A–F are a visualisation of the operations on the spectra during the reconstruction.
Figure 5B:
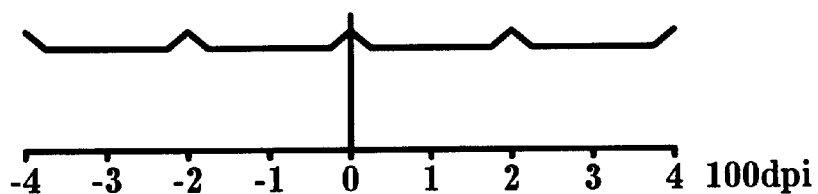
Figure 5C:
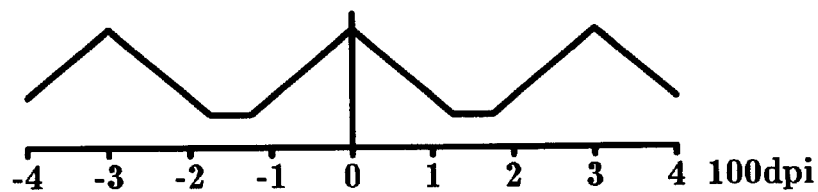

FIG. 5A shows the spectrum H of an original image h obtained by subjecting the latter to a Fourier transform. FIGS. 5B and 5C respectively show the spectra $H_1$ and $H_2$ respectively of the two scanning signals associated with the scanning frequencies f1 and f2 respectively. It will be clear that these spectra are not suitable for reconstructing the original signal h faultlessly therefrom, due to the overlapping of the periodic repetitions.

Second Step

For the purpose of explanation, an auxiliary frequency fx will first be introduced, which is defined as:

$$fx=K(f1, f2),$$

where K denotes the lowest common multiple.

In the example, therefore, fx=600 dpi.

The following superposition s is selected for the example described:

$$s=T^{-100}H_1-H_2$$

This choice is based on the following considerations. Assuming that the original signal h was scanned at a frequency fx, i.e. 600 dpi, then the spectrum of the scanning signal was:

$$H_x = \sum_k T^{600k} H$$

It will readily be seen that $$H_1=(1+T^{200}+T^{400})H_x$$

$$H_2=(1+T^{300})H_x$$

In order to avoid overlapping as much as possible, there is selected for the superposition a combination in which the shift differences are kept as small as possible. A good choice, therefore, is the above-mentioned combination, because in that case:

$$T^{-100}H_1-H_2=(T^{-100}-1+T^{100})H_x$$

Figure 5D:
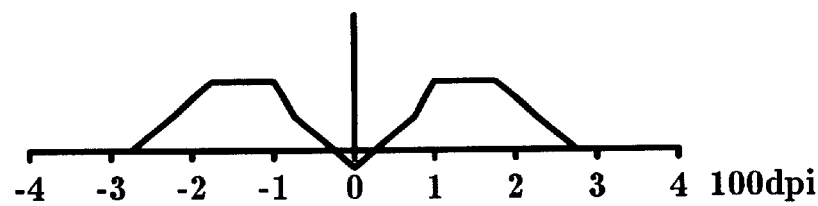

One period is now cut out of the result s of the superposition by setting equal to zero all the spectra values outside (−fx/2, fx/2), in this example. (−300, 300). The result of this is shown in FIG. 5D.

When the bandwidth of the original signal h is less than 200 dpi, generally (f1+f2−G(f1, f2))/2, where G denotes the largest common divisor, this equation also applies when $H_x$ is replaced by H, because then there is no overlapping of spectra. In the case of larger bandwidths, the resulting signal is distorted.

Third Step

The resulting spectrum is then unravelled by again subjecting it to a combined shift operator. A good choice for this shift operator is, in this example:

$$(T^{-200}+T^{-100}-T^{100}-T^{200})$$

Figure 5E:
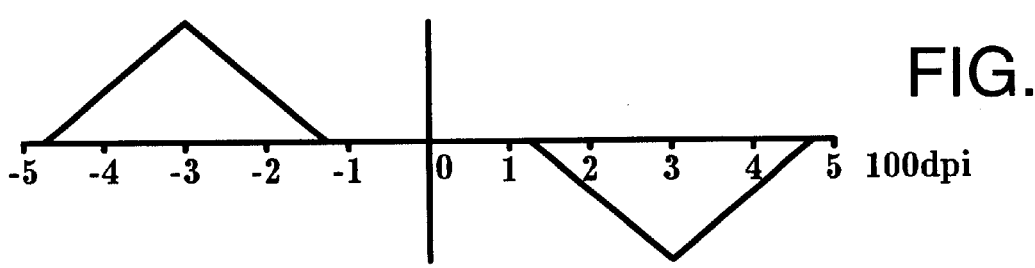

The result of this unravelling is shown in FIG. 5E.

Figure 5F:
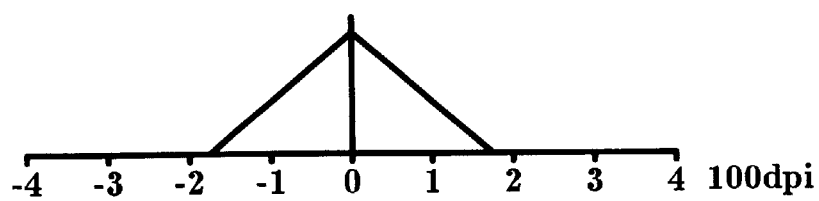

A cut-out is made from this spectrum between (−fx, 0), in this example (−600, 0), whereafter a last translation $T^{fx/2}$, in this example $T^{300}$, delivers an approximated spectrum H' of the original signal h. This is shown in FIG. 5F.

Fourth Step

An estimate of the original signal h can then be calculated from the spectrum H' using an inverse Fourier transform. To have the signal available at the required frequency f3 after transformation, the spectrum H' is first periodically repeated with period f3 by using the operator.

$$\sum_{k=-\infty}^{\infty} T^{kf3}$$

and then subjected to inverse Fourier transformation.

In practice, this step is carried out in one operation by using a discrete inverse Fourier transform with the correct period.

The process has been explained as an example hereinbefore for the case of f1=200 dpi, f2=300 dpi.

The process will now be described in general form hereinafter.

The scanning frequencies should be so selected that f1/f2 is a rational ratio (this is always the case in practice due to the construction of the scanner with discrete CCD arrays). There are then natural numbers a and b, for which:

$$f1=G(f1, f2) \cdot a$$

$$f2=G(f1, f2) \cdot b$$

$$fx=b \cdot f1=a \cdot f2$$

where G(f1, f2) is the largest common divisor of f1 and f2.

First Step

The first step comprises Fourier transformation of the signals obtained by scanning with scanning frequency f1 and f2 respectively, and is of course the same as the first step described above in the exemplified process.

Second Step

The invention then defines an operator $S=T^{G(f1, f2)}$ and operators $P_a$ and $P_b$, for which:

$$P_a=(1+S^a+S^{2a}+\ldots+S^{(b-1)a})$$

$$P_b=(1+S^b+S^{2b}+\ldots+S^{(a-1)b})$$

then:

$$H_1=P_a H_3$$

$$H_2=P_b H_3$$

There are now operators A and B, for which:

$$A \cdot P_a + B \cdot P_b = G(P_a, P_b)$$

$G(P_a, P_b)$ is the largest common divisor of the operators $P_a$ and $P_b$, contained as polynomials in S.

A, B and $G(P_a, P_b)$ can be found by using the Euclidean algorithm known in mathematics. In the above exemplified case, this would give:

$$G(P_a, P_b)=1-S^1+S^3-S^4+S^5-S^7+S^8$$

$$A=-S^1$$

$$B=1+S^3$$

The following is now taken as superposition s (again for the general case):

$$s = S^{-(a-1)(b-2)/2}(A \cdot H_1 + B \cdot H_2)$$

One period is now cut out of the result s of the superposition by making all the spectrum values outside (−fx/2, fx/2) equal to zero.

If the bandwidth of the original signal h is limited within the value (f1+f2−G(f1,f2))/2, then the following also applies:

$$s + S^{-(a-1)(b-1)/2} G(P_a, P_b) \cdot H$$

Third Step

The resulting spectrum is then unravelled by subjecting it to the following operator:

$$S^{(1-a-b)/2}(1-S^1)(1+S^1+\ldots+S^{a-1})(1+S^1+\ldots+S^{b-1})$$

From this spectrum a cut-out is made between (−fx,0), whereafter a last translation $T^{fx/2}$ gives an approximated spectrum H' of the original signal h.

If the bandwidth of the original signal h is limited within the value (f1+f2−G(f1,f2))/2, then the unravelling yields:

$$H' = (S^{-fx/2} - S^{fx/2}) H$$

so that H and h are exactly reconstructed.

Fourth Step

This is again the same as the fourth step described above. This completes the reconstruction.

By applying the above techniques it is possible, using two cameras having relatively low resolutions f1 and f2 which differ from one another, to construct a scanner device which can deliver digital image signals having a relatively high frequency f3. The latter image signals are then synthesised from the signals of the two cameras using the above-described method.

It should be noted that the synthesised signal has a frequency content defined by f3=(f1+f2−G(f1,f2)). Selecting a value for f3 higher than (f1+f2−G(f1,f2)) does not yield a sharper image than that for the value mentioned here.

In the example, the (discrete) Fourier transform was utilised. However, other orthogonal transformations, such as, for example, (discrete) cosine transform may be utilised by the invention. The method is not changed as a result, although the operators used may differ. It is within the scope of the skilled man to adapt the operators for other transformations, the person of ordinary skill in the art, in this case, having a wide knowledge of both signal theory and mathematics.

The scan signals can also be generated with two-dimensional CCD arrays of different resolutions, or one or two identical two-dimensional arrays with different magnification optics. The image signals can be synthesised, similarly to the above-described method, by a suitable adaptation of the data processing, either by splitting the two-dimensional algorithm into one-dimensional operations, or by adapting the theory for the two-dimensional case.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. A method of generating digital image data, comprising:
   generating first digital image data by scanning an image with a first scanner having a first resolution f1;
   generating second digital image data by scanning the image with a second scanner having a second resolution f2 higher than f1; and
   combining the first and second digital image data to form third digital image data, which describe the image with a third resolution f3 which is higher than f1 and higher than f2.

2. The method according to claim 1,
   wherein said combining of the said first and second digital image data comprises:
   a) transforming the first digital image data into a first spectrum, and transforming the second digital image data into a second spectrum, wherein the first and second spectra each have an amplitude on a spectral axis;
   b) superposing in a predetermined manner versions of the first and second spectra shifted over the spectral axis, to produce a first combination;
   c) deriving a third spectrum from the first combination; and
   d) re-transforming the third spectrum to output digital image data as said third digital image data.

3. The method according to claim 2,
   wherein an orthogonal transform is used in said step a).

4. The method according to claim 3,
   wherein the orthogonal transform is a Fourier transformation.

5. The method according to claim 3,
   wherein the orthogonal transform is a cosine transformation.

6. A method according to claim 2,
   wherein said step c) comprises:
   c1) removing repetitions from the first combination in such manner that a single period remains;
   c2) superposing copies of the single period, wherein the copies are shifted by the spectral axis, to form a second combination;
   c3) making a cut-out from the said second combination, in such manner that one spectrum remains; and
   c4) shifting the one spectrum over the spectral axis by a distance determined in accordance with a predetermined criterion, in such manner that the one spectrum comes to rest symmetrically on the spectral axis.

7. The method according to claim 6,
   wherein said step c1) is performed by making the amplitude of the combined spectrum equal to zero for frequency values less than −fx/2 and larger than fx/2, wherein fx is the lowest common multiple of f1 and f2.

8. The method according to claim 6,
   wherein said step c3) is performed by making the amplitude of the second combination equal to zero for frequency values less than −fx and greater than zero, wherein fx is the lowest common multiple of f1 and f2.

9. The method according to claim 7,
   wherein said step c4) is performed by shifting the one spectrum over a distance fx/2, wherein fx is the lowest common multiple of f1 and f2.

10. The method according to claim 1,
    wherein the resolutions are so selected that f3=f1+f2−G(f1,f2)
    wherein G(a,b) is the highest common divisor of a and b.

11. The method according to claim 1,
    wherein f1, f2 and f3 are approximately equal to 200 dpi, 300 dpi and 400 dpi, respectively.

12. The method according to claim 1,
   wherein f1, f2 and f3 are approximately equal to 300 dpi, 400 dpi and 600 dpi.

13. An apparatus for generating digital image data, comprising
   means for scanning an image with a first resolution f1 to generate first digital image data;
   means for scanning the image with a second resolution f2 to generate second digital image data, wherein the second resolution f2 is higher than f1; and
   means for combining the first and second digital image data, relating to a same portion of the image, to produce third digital image data, which describe the image with a third resolution f3 higher than f1 and higher than f2.

14. The apparatus according to claim 13,
   said scanning means comprising a scanner constructed from an array of electro-optical converters and means for imaging at least a part of the image on the array.

15. The apparatus according to claim 13, said scanning means comprising two scanners, one of which scans the image with the first resolution f1 and the other scans the image with the second resolution f2.

16. The apparatus according to claim 13, said scanning means comprising a scanner provided with means for scanning an image with first and second resolutions f1, f2 and a memory for intermediate storage of the digital image data, said memory connected to said scanning means, and said combining means.

17. The apparatus according to claim 13,
   wherein said combining means comprises:
   a) means for transforming the first digital image data into a first spectrum, and transforming the second digital image data into a second spectrum, wherein the first and second spectra have an amplitude on a spectral axis,
   b) means for superposing in a predetermined manner versions of the first and second spectra, shifted over the spectral axis, to produce a first combination,
   c) means for deriving a third spectrum from the first combination, and
   d) means for retransforming the third spectrum.

18. The apparatus according to claim 13,
   wherein f1, f2 and f3 are approximately equal to 200 dpi, 300 dpi and 400 dpi, respectively.

19. The apparatus according to claim 13,
   wherein f1, f2 and f3 are approximately equal to 300 dpi, 400 dpi and 600 dpi.

20. A method of generating digital image data, comprising:
   scanning an image with a first scanner having a first resolution f1 to generate first digital image data;
   scanning the image with a second scanner having a second resolution f2 which is higher than f1 to generate second digital image data;
   transforming the first and second digital image data into a frequency domain;
   combining the transformed first and second data, including superposing the transformed first and second data, in the frequency domain; and
   retransforming the combined data from the frequency domain to form third digital image data, which describe the image with a third resolution f3 which is higher than both f1 and f2.

* * * * *